UNITED STATES PATENT OFFICE.

WILHELM BAUER, OF VOHWINKEL, NEAR ELBERFELD, AND ALFRED HERRE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

BLUE VAT DYE.

958,464.  Specification of Letters Patent.  Patented May 17, 1910.

No Drawing.  Application filed January 12, 1910. Serial No. 537,724.

*To all whom it may concern:*

Be it known that we, WILHELM BAUER and ALFRED HERRE, doctors of philosophy, chemists, citizens of the German Empire, residing at, respectively, Vohwinkel, near Elberfeld, and Elberfeld, Germany, have invented new and useful Improvements in New Vat Dyes, of which the following is a specification.

Our invention relates to the manufacture and production of new and valuable vat dyestuffs. They are obtained by condensing substituted isatin derivatives containing a substituent, especially halogen and methyl, in the benzene nucleus in which isatin compounds the oxygen of the alpha-keto group is replaced by easily movable or replaceable substituents, e. g. halogen, sulfur, the amino group, the alkoxy group with 4-bromo-1-naphthol.

The new dyes are in a dry state dark blue crystalline powders with a metallic luster which are soluble in hot nitrobenzene generally with a blue coloration, and which yield with hydrosulfite and caustic soda lye vats dyeing cotton after exposure to air blue shades remarkable for their fastness to chlorin.

In order to illustrate the new process more fully we can proceed as follows, the parts being by weight:—100 parts of dibromoisatin are converted in a dry benzene suspension into dibromoisatin chlorid by heating it with 72 parts $PCl_5$. The mixture thus obtained is then poured into a solution which is well stirred of 80 parts of 4-bromo-1-naphthol in dry benzene. The stirring is continued for a short time and the dye which separates on cooling is filtered off and washed. It is a dark blue crystalline powder with a copper luster soluble in hot benzene with a pure blue, and in concentrated sulfuric acid with a greenish blue coloration. It yields with hydrosulfite and NaOH a yellow vat from which cotton is dyed yellow changing on exposure to air into a fast clear blue fast to chlorin.

Instead of the above isatin derivatives others may be used, e. g. chloro-, bromo-, chlorobromo- or dichloroisatin chlorid, ortho-bromo-para-methylisatin chlorid, tribromo-isatin-chlorid, para-bromo-ortho-methylisatin chlorid, ortho-para-dimethylisatin chlorid, etc.

We claim:—

1. The herein described new dyestuffs obtainable from a substituted isatin derivative containing a substituent in the benzene nucleus in which compound the oxygen of the alpha-keto group is replaced by an easily movable or replaceable substituent and 4-bromo-1-naphthol, which dyestuffs are in a dry state dark blue crystalline powders with a metallic luster which are soluble in hot nitrobenzene generally with a blue coloration, and which yield with hydrosulfite and caustic soda lye vats dyeing cotton after exposure to air blue shades remarkable for their fastness to chlorin, substantially as described.

2. The herein described new dyestuff obtainable from dibromoisatin-alpha-chlorid and 4-bromo-1-naphthol, which dyestuff is in a dry state a dark blue crystalline powder with a copper luster, soluble in hot benzene with a pure blue and in concentrated sulfuric acid with a greenish blue coloration, and which yields with hydrosulfite and caustic soda lye a yellow vat from which cotton is dyed yellow changing on exposure to air into a clear blue remarkable for its fastness to chlorin, substantially as described.

In testimony whereof we have hereunto set our hands in the presence of two subscribing witnesses.

WILHELM BAUER. [L. S.]
ALFRED HERRE. [L. S.]

Witnesses:
 OTTO KÖNIG,
 CHAS. J. WRIGHT.